United States Patent [19]

Ogasawara

[11] Patent Number: 5,257,248
[45] Date of Patent: Oct. 26, 1993

[54] INFORMATION RECORDING APPARATUS CAPABLE OF EFFICIENTLY VERIFYING RECORDING INFORMATION

[75] Inventor: Yutaka Ogasawara, Yokohama, Japan

[73] Assignee: Canon Kabushiki Kaisha, Tokyo, Japan

[21] Appl. No.: 498,621

[22] Filed: Mar. 26, 1990

[30] Foreign Application Priority Data

Mar. 28, 1989 [JP] Japan .................. 1-75417

[51] Int. Cl.$^5$ ............................................. G11B 7/013
[52] U.S. Cl. ............................................. 369/32; 369/54; 369/58; 369/59; 369/275.3; 360/53
[58] Field of Search ............... 369/54, 58, 59, 32, 369/275.4, 275.3, 56, 57; 360/53

[56] References Cited

U.S. PATENT DOCUMENTS

| | | | |
|---|---|---|---|
| 4,611,314 | 9/1986 | Ogata et al. ............. | 369/32 |
| 4,760,566 | 7/1988 | Kobayashi et al. ........ | 369/59 |
| 4,835,757 | 5/1989 | Abiko .................... | 369/54 |
| 4,870,634 | 9/1989 | Sakagami ................ | 369/32 |
| 4,872,154 | 10/1989 | Sakagami et al. ......... | 369/54 |
| 4,873,679 | 10/1989 | Murai et al. ............ | 369/32 |
| 4,896,311 | 1/1990 | Ishihara ................. | 369/59 |
| 4,920,528 | 4/1990 | Sakamoto et al. ......... | 369/54 |
| 4,949,326 | 8/1990 | Takagi et al. ........... | 369/54 |
| 4,964,094 | 10/1990 | Satoh et al. ............ | 369/59 |
| 4,982,074 | 1/1991 | Ogasawara ............... | 369/58 |
| 4,984,227 | 1/1991 | Yoshimaru ............... | 369/58 |
| 4,998,009 | 3/1991 | Iijima et al. ........... | 369/58 |
| 5,034,914 | 7/1991 | Osterlund ............... | 369/32 |
| 5,124,851 | 6/1992 | Masui et al. ............ | 360/53 |
| 5,142,514 | 8/1992 | Verboom et al. .......... | 360/53 |

Primary Examiner—Tommy Chin
Assistant Examiner—Khoi Truong
Attorney, Agent, or Firm—Fitzpatrick, Cella, Harper & Scinto

[57] ABSTRACT

An apparatus for recording information on a disk-shaped medium with an appropriate amount of information, and allowing immediate verifying of the recorded information. The apparatus includes a unit for recording information of a recording unit on a recording medium, a verifying unit for verifying the recorded information, adapted, after recording the information of the recording unit, to effect a track jump from the last sector of the recording unit to a first sector; and a unit for selecting the number of sectors in the recording unit in such a manner that the position after the track jump from the last second of a recording unit is in front of the first sector by a predetermined number of sectors.

8 Claims, 7 Drawing Sheets

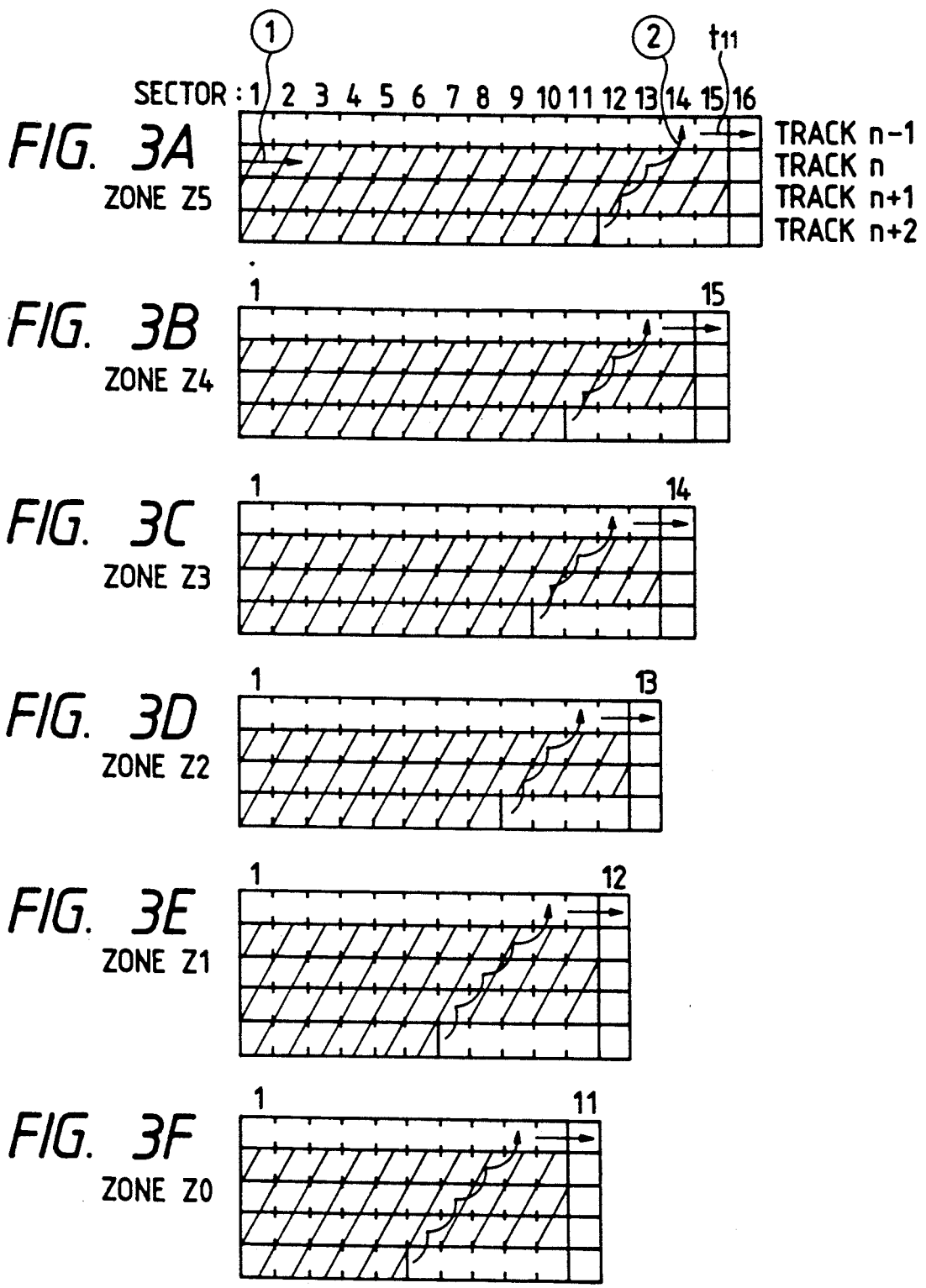

000
INFORMATION RECORDING APPARATUS CAPABLE OF EFFICIENTLY VERIFYING RECORDING INFORMATION

BACKGROUND OF THE INVENTION

Field of the Invention

The present invention relates to an apparatus for recording information on a rotatable recording medium.

Related Background Art

Among disk-shaped information recording media with a spiral track divided into plural sectors, there are already known magnetic disks and optical disks.

In case of optical disks, associated with a higher rate of errors in the information recording, the reliability of data is improved by attaching an error correcting code (ECC) to the data. Also there is known a method of verifying proper recording by reproducing the data after recording thereof, and, in case of an error, repeating the data recording in the same sector again or in an alternative sector, thereby rescuing a defective sector. The addition or deletion of such error correction code and the verification are conducted by an ECC circuit to be explained later.

In such information record/reproducing apparatus, the data recording on an optical disk is conducted either in a constant angular velocity (CAV) method in which the record pits are formed with a constant angular velocity on the track, or in a constant line velocity (CLV) method in which the record pits are formed with a constant linear velocity.

In said CAV method, in which the recording is conducted with a constant angular velocity, the efficiency of utilization of the recording capacity is inferior to that in the CLV method, since the recording density is lower in the peripheral area than in the central area of the disk.

On the other hand, in the CLV method, the access time becomes inevitably longer as the data reproduction is not possible until the revolution reaches a predetermined value at the access, since the sectors are not aligned in the radial direction and the revolution varies according to the recording position.

For this reason, a modified constant angular velocity (MCAV) method allowing easy access as in the CAV method and having the superior recording density of the CLV method is proposed for example in Japanese Laid-Open Patent Application no. 59-167874.

In said MCAV method, the disk is divided into plural zones in the radial direction, and the recording is conducted with a lower revolution in the outer zone, thereby avoiding the drawback of the CAV method that the recording density becomes lower in the peripheral area.

Also, there is proposed, in U.S. Pat. No. 4,918,677, a MCAV method of similar effect in which the revolution of the disk is maintained constant in the central and peripheral areas, but the frequency of signal recording and reproduction is increased in the peripheral area.

The information record/reproducing apparatus for data recording and/or reproduction by an optical disk is usually provided with a buffer for data read/writing. Said buffer is used for temporary storage of the writing data from a host apparatus or of the read data from the optical disk, and is required because of the difference between the data transfer rate of said host apparatus and the record/reproducing rate of the optical disk.

In general, the data transfer rate of the host apparatus is faster than the record/reproducing speed of the optical disk.

If the amount of writing data from the host apparatus is larger than the capacity of the buffer, the recording is conducted at a time by a unit data amount corresponding to a predetermined number of sectors (a writing data unit). The verification of the data is then conducted, followed eventually by alternative data recording. Then the data of next writing data unit are fetched in the buffer, and the recording and verification are repeated.

Said writing data unit is determined in consideration of the buffer capacity and the recording method.

FIG. 6 is a schematic view showing the verifying operation conducted by the above-mentioned ECC circuit and the data recording operation by the addition of the error correcting code.

In the illustrated example, the verification process is divided into two phases. A first phase fetches the reproduced data in an ECC memory, and a second phase executes a verifying check. In the verification process for example for a sector 1, a step "Input 1" fetches the data reproduced from the sector 1 into the ECC memory, and a step "Process 1" executes the verifying check. Since the disk continues to rotate, the result of verification of the the sector 1 is obtained about when the reproducing head reaches the end of the sector 2. Similarly the result of verification of the sector 2 is obtained about when the reproducing head reaches the end of the third sector 3.

In the present example, a pipeline processing is possible so that the data reproduced from a succeeding sector are fetched during the verification of a preceding sector.

On the other hand, the data recording process with ECC addition is divided into three phases. A first phase enters data from said buffer into the ECC memory. A second phase effects modulation with the addition of ECC, and a third phase sends the data with added ECC to a record/reproducing unit for recording.

For example, the data recording in the fifth sector 5 is achieved by entering the data from the buffer to the ECC memory at the position of the third sector 3, then modulating the entered data at the position of the fourth sector 4, and recording thus modulated data in the fifth sector 5. Similarly the data entry for the sixth sector 6 is started at the position of the fourth sector 4, and that for the seventh sector 7 is started at the position of the fifth sector 5.

Also FIGS. 7A to 7E schematically illustrate the recording operation on a track, in case the amount of writing data from the host apparatus exceeds the capacity of the buffer.

In these drawings, each of the tracks $n-1$, $n$, $n+1$, $n+2$, . . . contains sectors 1-16.

It is assumed that a writing data unit has a size of 24 sectors, and the data recording is started from the first sector 1 of the track n. At first the data of a writing data unit are recorded, as indicated by an arrow (1), in 24 sectors indicated by diagonal lines from the first sector 1 of the track n to the eighth sector 8 of the track $n+1$. Then the head jumps to the track $n-1$, as indicated by an arrow (2), for verification, and awaits the rotation of the disk for a period $t_1$. When the disk rotates to the sector 1 of the track n, the data are reproduced in succession from said sector 1 as indicated by an arrow (3), and the verifying check is conducted on thus reproduced data. As explained above, the verifying check for the final sector of the writing data unit (sector 8 of the track n+1) is completed after the head moves to the first sector of the next writing data unit (ninth sector 9 of the track n+1).

Consequently the recording operation for the next writing data unit cannot be conducted until said verification process is completed. For effecting the recording of the next writing data unit after the completion of said verifying check process, the head jumps to the track n as indicated by an arrow (4), and awaits the rotation of the disk for a period $t_2$. Then, the above-explained data fetching and modulation are started as the head approaches to the sector 9 of the track n+1, and the recording is conducted starting from said sector 9 of the track n+1 as indicated by an arrow (5). After the completion of recording, the head jumps to the track n+1 as indicated by an arrow (6), then awaits the rotation of the disk for a period $t_3$, and the verifying check is thereafter conducted as indicated by an arrow (7).

Thereafter the recording and verifying check for the succeeding writing data units are repeated in a similar manner.

However, the above-explained conventional technology requires a long processing time, since waiting of disk rotation for the period $t_1$, $t_3$ is needed, at the jumping to the preceding track for verifying check after the recording of a writing data unit, until the first sector of the unit to be verified is reached.

Also a long processing time is required after the end of said verifying check, since the recording of a succeeding writing data unit cannot be immediately started but the head has to jump to a preceding track and awaits the rotation of the disk for a period $t_2$ until the first sector in the next writing data unit is reached.

SUMMARY OF THE INVENTION

An object of the present invention is to provide an information recording apparatus not associated with above-mentioned drawbacks.

Another object of the present invention is to provide an information recording apparatus capable of immediately verifying the recorded information by selecting a suitable unit recording data amount.

Still another object of the present invention is to provide an information recording apparatus capable of immediately effecting next information recording, by selecting a suitable data amount in the verification of the information recorded by a recording unit.

Still another object of the present invention is to provide an information recording apparatus capable of improving the throughput of information recording, thereby reducing the processing time of the recording apparatus.

Still other objects of the present invention, and the advantages thereof, will become fully apparent from the appended claims and the following description which is to be taken in conjunction with the attached drawings.

BRIEF DESCRIPTION OF THE DRAWINGS

FIGS. 3A to 3F are schematic views showing a data recording operation in different zones of said recording area;

DETAILED DESCRIPTION OF THE PREFERRED EMBODIMENTS

Figure 1:
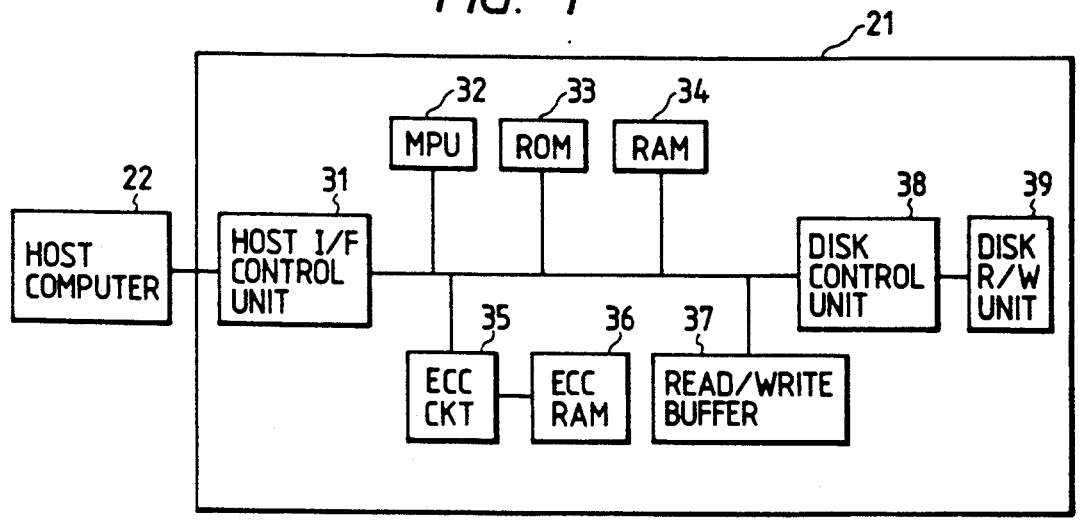
FIG. 1 is a block diagram of an information record/reproducing apparatus constituting an embodiment of the present invention.

FIG. 1 is a block diagram of an information record/reproducing apparatus constituting an embodiment of the present invention.

Said information record/reproducing apparatus 21 employing an optical disk as the recording medium is provided with a host interface (I/F) control unit 31 for exchanging commands and data with a host computer 22; a MPU 32 controlling the entire functions of said apparatus; a ROM 33 storing programs for said MPU 32; a RAM 34 constituting a work memory for the MPU 32; an ECC circuit 35 effecting modulating and demodulating functions for adding or deleting said error correcting code (ECC) to or from the data and a verifying check function explained above; an ECCRAM 36 constituting a work memory for said ECC circuit 35; a read/write buffer 37 of a capacity of 64 KB for storing the read/write data; a disk read/write unit 39 for data recording or reproduction to or from the optical disk; and a disk control unit 38 for controlling said disk read/write unit 39.

The present embodiment employs, among two MCAV methods mentioned above, the MCAV method in which the recording area of the optical disk is divided radially into plural annular zones, and the recording/reproduction is conducted by reducing the revolution of the disk as the head moves from the internal zone to the external zone. The record/reproducing operation in this MCAV method is conducted by the MPU 32, which identifies the zone where the head is positioned based on the address information contained in the reproduced signal from the read/write unit 39 and supplies the read/write unit 39 with a revolution control signal according to the result of said identification. Change in the revolution is conducted in a changing area between the zones.

The above-mentioned read/write buffer 37 is provided for absorbing the difference between the data transfer rate of the host computer 22 and the record/reproducing rate for the optical disk in the disk read/write unit 39, and for temporary data storage for data modulation/demodulation in the ECC circuit 35. In the present embodiment the data transfer rate of the host computer 22 is assumed to be higher than the record/reproducing rate of the optical disk.

This information record/reproducing apparatus is capable, simultaneous with the loading of the writing data from the host computer 22 into the read/write buffer 37, of sending the data already loaded in said buffer 37 to the disk read/write unit 39 for data recording, and this function is conducted by an unrepresented DMA circuit. Also the host I/F control unit 31 has a function of interrupting and re-opening the data loading from the host computer 22. In the present embodiment, the number of sectors in said writing data unit is variable depending on the zone in the optical disk, but is so selected as to correspond approximately to a half of the capacity of the buffer 37. Consequently, in the data recording operation, the data of a next writing data unit are loaded in the buffer 37 and are made available for recording immediately after the end of recording of the data of the preceding recording data unit, whereby the data writing process to the optical disk can be continued without interruption.

Figure 2:
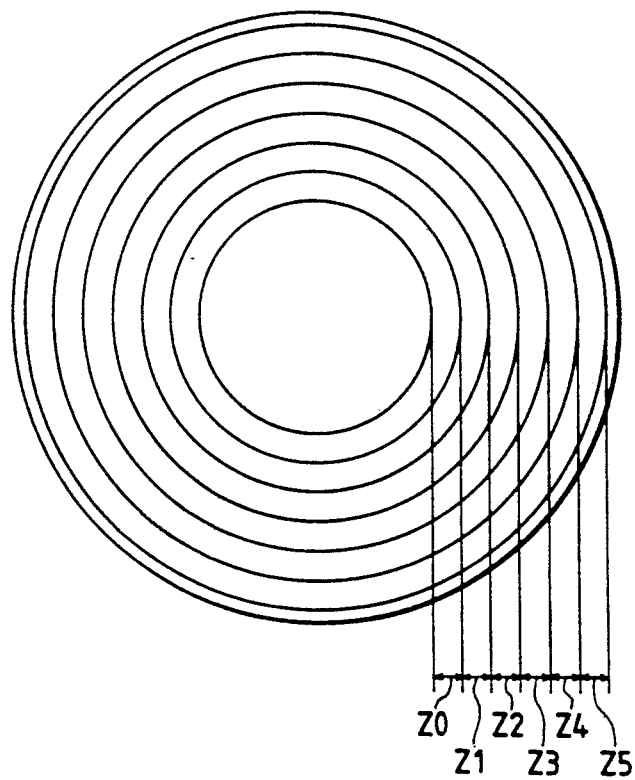
FIG. 2 is a plan view showing the structure of a recording area of an optical disk employed in said embodiment.

FIG. 2 is a plan view showing the structure of the recording area of the optical disk employed in the present embodiment.

The recording area of said optical disk is divided, from inside to outside, into six zones Z0–Z5, each including plural tracks. The number of sectors in a track is 11 in the innermost zone Z0, increases stepwise for every zone toward the outside, and is 16 in the outermost zone Z5.

FIGS. 3A to 3F are schematic views showing the data recording operation in said zones Z0–Z5.

In FIG. 3A, tracks n−1, n, n+1, n+2, ... belong to the outermost zone Z5, and each track is composed of sixteen sectors 1–16, each having a capacity of 1 KB. Among said sectors 1–16, the first to fifteenth sectors 1–15 are used for recording the data of a user, and the sixteenth sector 16 is used as an alternative sector in case of a recording error.

In said outermost zone Z5, the size of a writing data unit is selected as 41 sectors.

In the following there will be explained the operation of data recording, starting from the first sector 1 of the track n.

At first the data of a writing data unit are recorded in succession over 41 sectors (indicated by diagonal lines) from the sector 1 of the track n to the sector 11 of the track n+2, excluding the alternative sector 16 in each track, as indicated by an arrow (1). Then the head jumps to the track n−1 as indicated by an arrow (2) and awaits the disk rotations for a period $t_{11}$ for the verifying check. When the disk rotates to the sector 1 of the track n, the data are reproduced in succession from said sector 1, excluding the alternative sector, and the verifying check is conducted on thus reproduced data. After the end of the verifying check for the final sector (sector 11 of the track n+2) of said writing data unit, the recording of a next writing data unit is started from the sector 12 of the track n+2.

In said zone Z5, as explained above, the writing data unit is selected as 41 KB, in consideration of the rotating time corresponding to three sectors required for jumping of three tracks indicated by the arrow (1), rotating time corresponding to a sector for reproducing the first sector at the verification, and above-mentioned buffer capacity (64 KB). More specifically there is required the rotating time of two sectors for the stabilization of tracking and focusing of the light beam after the track jump. Also the rotating time of a sector is required for each track jump. Consequently the final sector of a writing data unit is preferably selected at the sector 12 of the track n+1 or the sector 11 of the track n+2, but the latter is selected as the final sector in consideration of the capacity of the buffer 37. Thus, also at the verification of the next writing data unit, the first sector can be reached by the rotating time of a sector, excluding the alternative sector.

In this manner the unnecessary waiting time can be eliminated at the verification process, and a faster processing can be achieved.

Also in each of the zones Z2–Z4 shown in FIGS. 3B to 3D, the number of sectors in the writing data unit is determined, as in the zone Z5, from the number of tracks to be jumped and a sector other than the alternative sector. More specifically, the number of sectors in the writing data unit in the zones Z4–Z2 is respectively 38, 35 and 32, corresponding to the number of sectors per track in these zones.

In the zones Z1 and Z0 shown in FIGS. 3E and 3F, the writing data unit can be increased by a track as compared to the zones Z5–Z2 because the number of sectors per track is lower. Thus, since 4 tracks can be used in a writing data unit, the data recording can be made from the sector 10 of the track n−1 to the sector 6 of the track n+3. Consequently said unit is 39 sectors in the zone Z1 and 35 sectors in the zone Z0.

In this manner, also in the zones Z4–Z0, the first sector can be reached in the verification process of a writing data unit only by a rotating time corresponding to a sector, excluding an alternative sector.

Figure 4A:
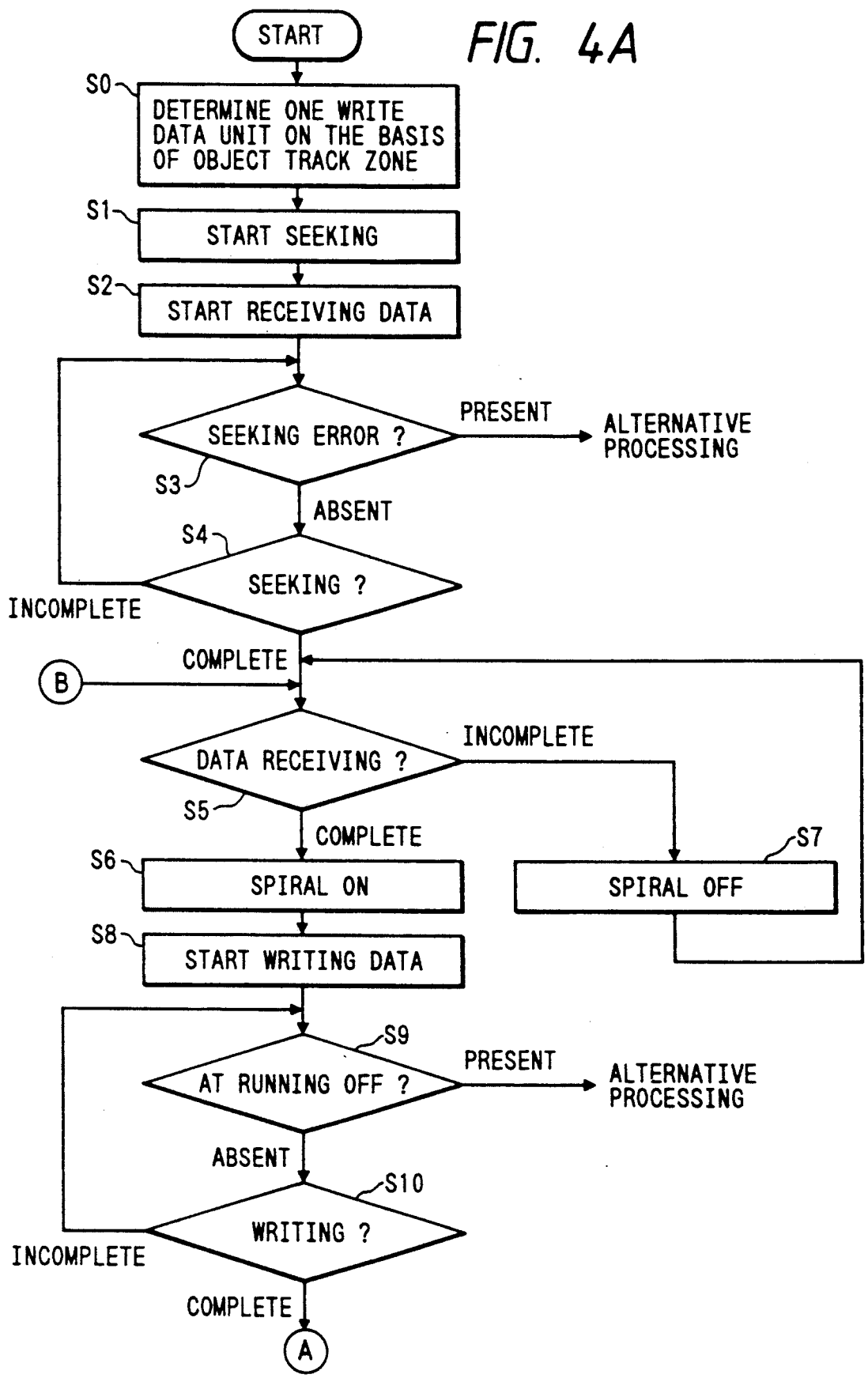
FIGS. 4A and 4B are flow charts showing a data recording process in said embodiment.
Figure 4B:
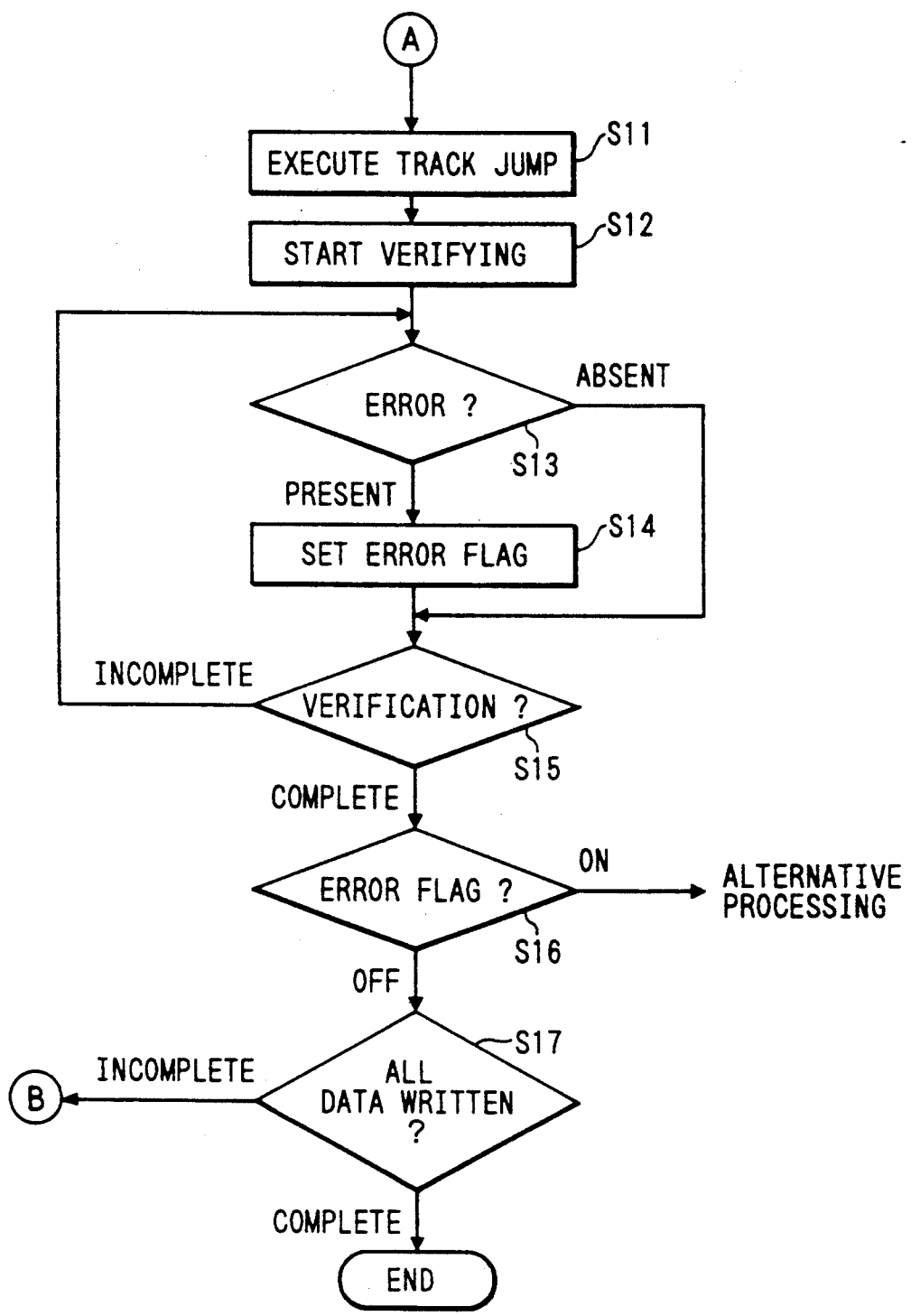

FIGS. 4A and 4B are flow charts of the data recording process in the information record/reproducing apparatus 21 explained above.

At first, in response to a write command from the host computer 22, the zone to be used is determined, and a writing data unit is determined according to said zone (S0). Then the disk R/W unit 39 starts the seeking operation to the desired track, and the host computer 22 simultaneously starts loading of the writing data into the read/write buffer 37 (S1, S2). If the seeking operation the disk R/W unit 39 cannot be conducted in normal manner (S3), there is conducted an alternative process, and the sequence waits until the completion of the seeking operation to the desired track (S4). Upon completion of said seeking operation, there is discriminated whether the data of a writing data unit to be recorded next are already loaded in the read/write buffer 37 (S5), and, if not loaded, there is conducted a spiral-off operation to be explained later and the sequence waits on the desired track until said data are loaded (S7). If the data are loaded, there is conducted a spiral-on step to be explained later, thereby releasing the spiral-off mode (S6), and the data recording is started (S8). The spiral-on operation mentioned above means the tracking along the spiral track with a movement of the recording head in the radial direction of the optical disk. The spiral-off operation means an inverse track jump after a turn on the spiral track, whereby the head remains on a same track.

In the data recording in the step S8, the data in the read/write buffer 37 are modulated for ECC addition by the ECC circuit 35 while they are stored in succession in the ECCRAM 36, and thus modulated data are sent to the disk R/W unit 39 for recording on a desired sector. If the recording operation is hindered by an abnormality in the tracking (S9), an alternative process is conducted.

In the absence of such tracking error, the data recording is continued to the next sector until the recording in the sectors of a number corresponding to a writing data unit is completed (S10). Upon completion of the recording of a writing data unit, the head jumps to a track capable of reproducing the first sector of thus recorded writing data unit (S11). Said track jump is conducted over a number of tracks depending on the zone as explained above, and the first sector for verification process can be reached from the position after said jump, by a rotating time corresponding to a sector excluding the alternative sector. The data are reproduced by the disk R/W unit 39 in succession from said first sector, and are subjected to the verifying check in the ECC circuit 35 while they are stored in the ECCRAM 36 (S12). If an error is found in said verifying check (S13), a flag is set in the RAM 34 corresponding to the error sector (S14), and the verifying check process is repeated for all the sectors in the writing data unit (S15). Upon completion of said process, there is discriminated whether the error flag is set in the RAM 34 (S16), and, if set, an alternative process is executed. If not set, the process of the steps S5 to S16 is repeated until all the data are recorded, and the recording operation is terminated upon completion of recording of all the data (S17).

In the foregoing embodiment there has been explained an apparatus employing the MCAV method utilizing different writing data units for different zones, but the present invention is not limited to such embodiment and is applicable also to the apparatus employing the CLV or CAV method or another MCAV method.

Also the buffer capacity and the data amount in a writing data unit are not limited to those in the foregoing embodiment but can be suitably modified according for example to the writing method.

More specifically, the time required for track jump is specific to each apparatus or each recording method, and the number of sectors in a writing data unit can be suitably determined according to said time.

FIGS. 5A to 5D are schematic views showing the data recording operations in another embodiment of the information record/reproducing apparatus of the present invention.

The apparatus of the present embodiment enables, after the verifying check of the data of a writing data unit, the recording operation for the next writing data unit, without jumping to the preceding track.

Figure 6:
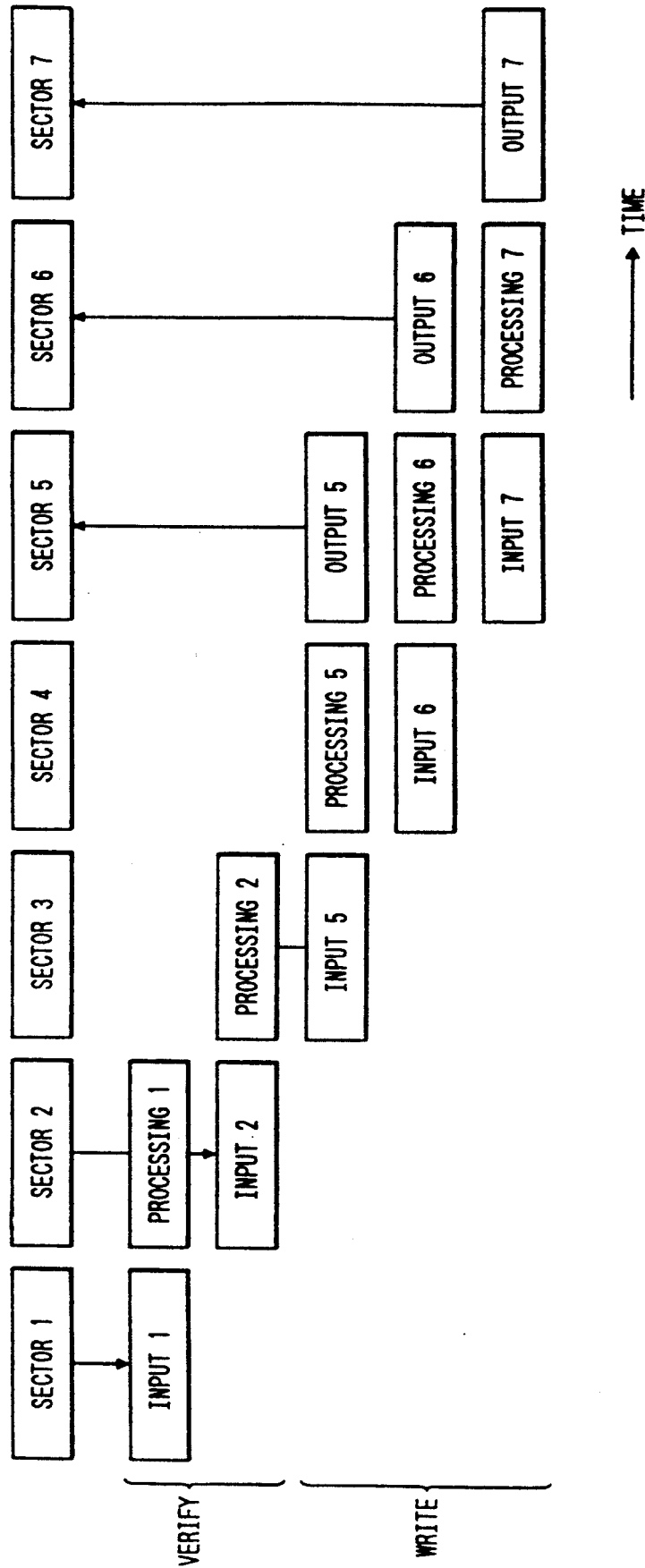
FIG. 6 is a schematic view showing the verifying process conducted in an ECC circuit and the data recording operation by ECC addition.
Figure 7A:
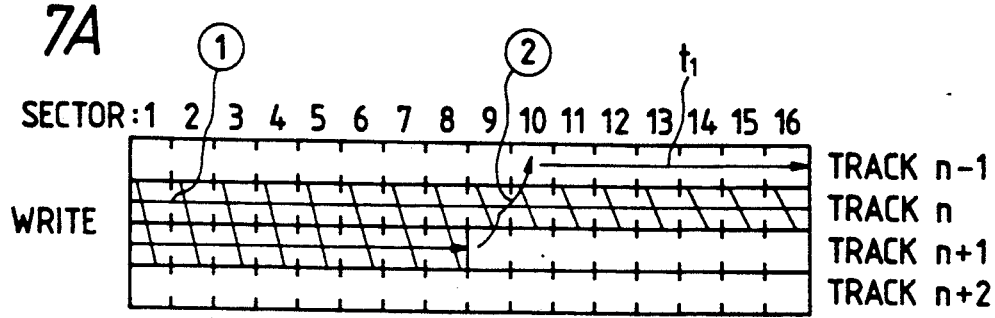
FIGS. 7A to 7E are schematic views showing the conventional recording operation on a track, in case the amount of writing data from the host apparatus exceeds the capacity of buffer.
Figure 7B:
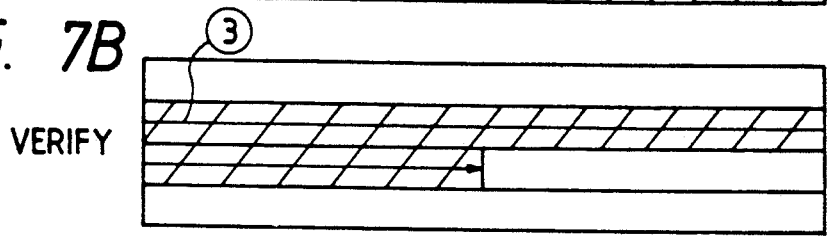
Figure 7C:
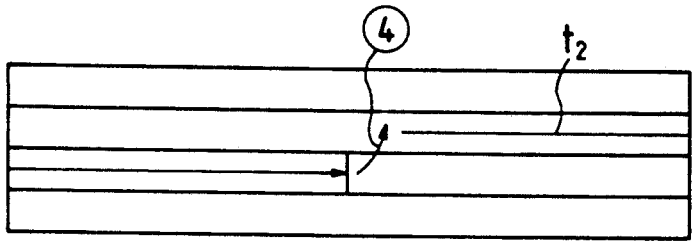
Figure 7D:
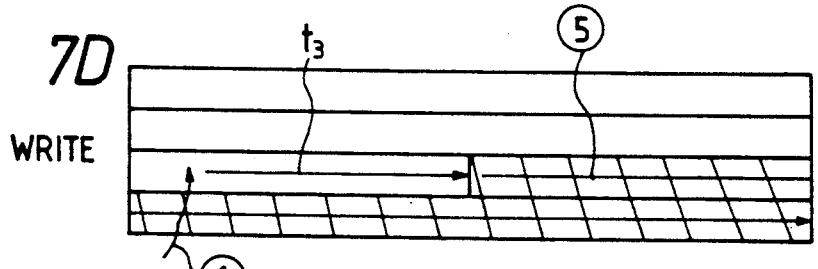
Figure 7E:
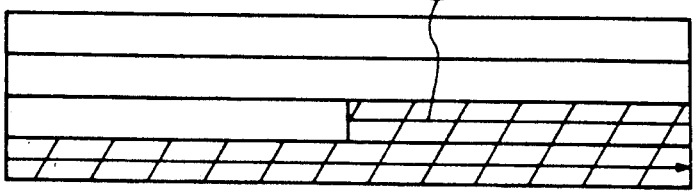

The structure of this information record/reproducing apparatus is same as shown in FIG. 1, and the recording process is conducted according to the flow chart shown in FIG. 4. It is also assumed that the data recording and the verifying check are conducted by a pipeline process as shown in FIG. 6.

In the following there will be a case in which a track is composed of 16 sectors, a writing data unit is composed of 24 sectors and the entire writing data are composed of 48 sectors, and in which the first writing data unit is recorded starting from the sector 1 of the track n. In the illustrated example, all 16 sectors in each track are allotted for recording the user data, and the alternative process is conducted by the sectors of a collective alternative area (not shown).

Figure 5A:
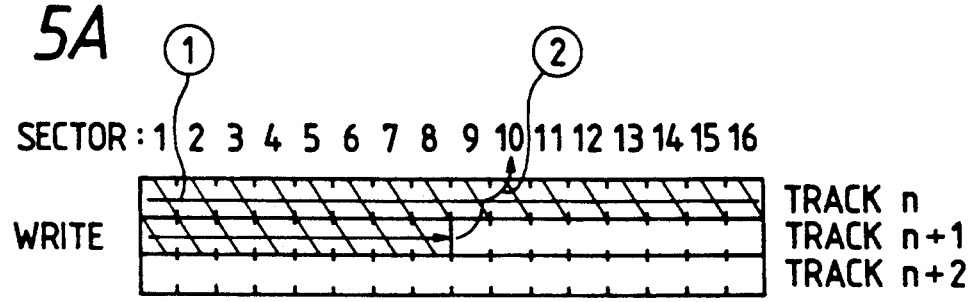
FIGS. 5A to 5D are schematic views showing the data recording operation in a second embodiment of the present invention.

At first, as shown in FIG. 5A, the data of a writing data unit are recorded in succession from the sector 1 of the track n, as indicated by an arrow (1). The recording is conducted in 24 sectors, indicated by diagonal lines, to the sector 8 in the track n+1. Then the head jumps to the track n−1 as indicated by an arrow (2) and awaits the rotation of the disk for the verifying check process. Also in the present embodiment, the rotating time to reach the first sector can be reduced by suitably selecting the number of sectors in the writing data unit, as in the foregoing embodiment.

Figure 5B:
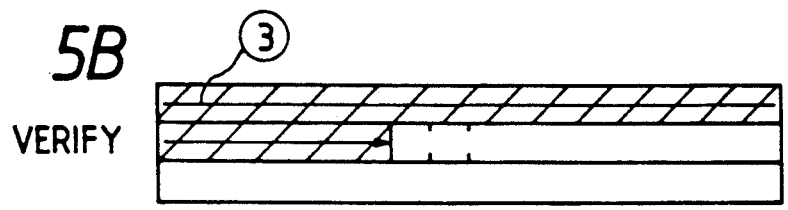
Figure 5C:
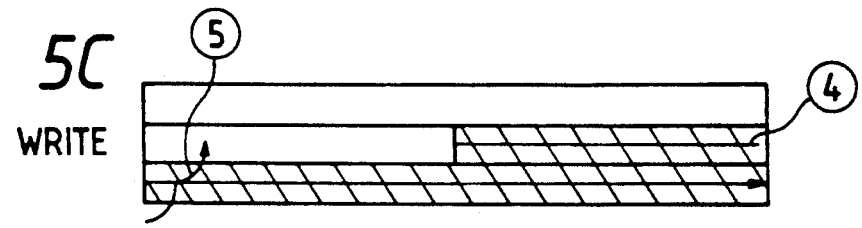

When the sector 1 of the track n is reached by said rotation of the disk, the reproduction is conducted from the sector 1 as indicated by an arrow (3) in FIG. 5B, and the verifying check is conducted on thus reproduced data.

However said verifying check process is not conducted to the final sector of the writing data unit (sector 8 of the track n+1), but to the second sector in front (sector 6 of the track n+1). Consequently, the recording process for the next writing data unit is started while the verifying check is not conducted for the last two sectors (sectors 7, 8 of the track n+1).

As explained in relation to FIG. 6, the result of verification of the sector 6 of the track n+1 is obtained when the head moves to the next sector 7, and, at this point, there is already started the operation of fetching, into the ECCRAM 36, the data of the next writing data unit to be recorded in the first sector (sector 9 of the track n 1). Then, when the head reaches the sector 8, modulation is conducted for the data of the first sector of the next writing data unit. Thus said data of the first sector are rendered recordable when the head reaches the sector 9, and are recorded in said sector 9. Thus the data of the next writing data unit can be recorded in a continuous tracking operation as indicated by an arrow (4), without jumping to the preceding track and waiting of the rotation.

Figure 5D:
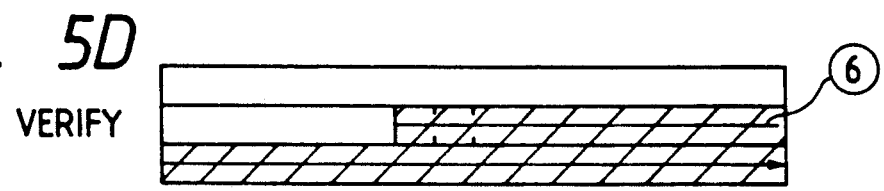

The data of the sectors 7, 8 of the track n+1, which are not verified in the processing of the preceding writing data unit, are verified, as indicated by an arrow (6) in FIG. 5D, prior to the verification of the succeeding writing data unit.

In the present embodiment, the recording process for the data of the next writing data unit is started when the head reaches a position in front, by two sectors, of the first sector, but the start timing of said recording process may be suitably selected in consideration of the time required for verification and the time required for preliminary processing such as the modulation mentioned above.

In the present embodiment, all the sectors in a track are allotted to the user data, but there may be provided an alternative sector in each track as in the foregoing embodiment.

The foregoing embodiments have been limited to information record/reproducing apparatus employing an optical disk as the recording medium, but the present invention is likewise applicable to apparatus employing other recording media, or to apparatus designed for information recording only.

As explained in the foregoing, the suitable selection of the size of a writing data unit according to the number of sectors in a track allows to reduce the waiting time for disk rotation in the verification process, thereby improving the throughput of data recording and reducing the process time.

Also an interruption in the course of verification for a writing data unit allows to proceed to the recording of next writing data unit in a continuous tracking operation, thereby reducing the waiting time for disk rotation, improving the throughput of data recording, and reducing the process time.

The present invention is not limited to the foregoing embodiments but is subject to variation and modifications within the scope and spirit of the appended claims.

What is claimed is:

1. An information recording apparatus for recording information on a recording medium having plural tracks, each of which contains plural sectors, said apparatus comprising:

recording means for recording, on the recording medium, information on a basis of a data unit having a capacity corresponding to a predetermined number of sectors;

verifying means for verifying the information recorded by said recording means after the recording of the unit of information;

track jump means for performing a track jump in order for said verifying means to verify the recorded information; and control means for determining the predetermined number of sectors of the unit so as to minimize a number of sectors between a sector to which the track jump is performed and a first sector in which the information of the unit is recorded, except for a number of sectors which are required to prepare for verifying the recorded information.

2. An apparatus according to claim 1, wherein said control means determines the predetermined number of sectors of the unit according to a number of sectors included in a track.

3. An apparatus according to claim 2, wherein said control means determines the predetermined number sectors of the unit according to a number of sectors rotating in a period required for the jump of a track.

4. An apparatus according to claim 1, wherein said recording means records information on the recording medium, in which the plural tracks are divided into plural zones, the number of sectors per track is increased toward the outer zones and the number of sectors in a unit is different in different zones.

5. An information recording apparatus for recording information on a recording medium having plural tracks, each of which contains plural sectors, said apparatus comprising:

recording means for recording, on the recording medium, information on a basis of a data unit having a capacity corresponding to a predetermined number of sectors, including means for modulating the information of the unit for recording in each sector;

verifying means for verifying in a verifying operation the information recorded by said recording means after recording of the unit of information;

track jump means for performing a track jump in order for said verifying means to verify the recorded information; and control means for interrupting the verifying operation by said verifying means leaving a predetermined number of unverified sectors of the unit recorded by said recording means, and for conducting the verifying operation of the predetermined number of unverified sectors, after the recording of information of a next unit and before the verifying operation of the recorded information of the next unit.

6. An apparatus according to claim 5, wherein said control means comprises means for determining the position for interrupting the verifying operation, depending on the number of sectors rotating in the period required for modulating, by said modulating means, the information to be recorded in one sector.

7. An apparatus according to claim 6, wherein said control means comprises means for determining a position for interrupting the verifying operation, depending on the number of sectors rotating in the period required for verifying the information recorded in one sector.

8. An apparatus according to claim 5, wherein said modulating means comprise means for adding an error correcting code to the information of the unit.

* * * * *

UNITED STATES PATENT AND TRADEMARK OFFICE
CERTIFICATE OF CORRECTION

PATENT NO. : 5,257,248  
DATED : October 26, 1993  
INVENTOR(S) : YUTAKA OGASAWARA It is certified that error appears in the above-indentified patent and that said Letters Patent is hereby corrected as shown below:

ON THE COVER PAGE:

Item [56] References Cited:  
Under "U.S. PATENT DOCUMENTS" the following should be inserted:

--4,918,677  4/1990  Ashinuma et al. ......369/32--.

--         FOREIGN PATENT DOCUMENTS 59-167874  9/1984  Japan...              --.

COLUMN 3:

Line 16, "to" should be deleted.

UNITED STATES PATENT AND TRADEMARK OFFICE
CERTIFICATE OF CORRECTION

PATENT NO. : 5,257,248  
DATED : October 26, 1993  
INVENTOR(S) : YUTAKA OGASAWARA It is certified that error appears in the above-indentified patent and that said Letters Patent is hereby corrected as shown below:

COLUMN 6:

Line 36, "tion the" should read --tion of the--.

COLUMN 8:

Line 26, "waiting of" should read --waiting for--.

COLUMN 10:

Line 36, "comprise" should read --comprises--.

Signed and Sealed this

Seventh Day of June, 1994

Attest:

BRUCE LEHMAN

Attesting Officer

Commissioner of Patents and Trademarks